United States Patent Office 2,800,747
Patented July 30, 1957

2,800,747

SOIL CONDITIONING

Harold M. Pitt, Torrance, Calif., assignor to Stauffer Chemical Company, a corporation of Delaware No Drawing. Application June 15, 1955,
Serial No. 515,774

5 Claims. (Cl. 47—58)

This invention relates to soil conditioning agents and, more particularly, relates to the use of sulfonium compounds as soil conditioning agents.

Many soil conditioning agents have been proposed in the past, but, in general, such conditioners are not true soil conditioners but are actually only stabilizers which maintain the soil in the condition in which it is at the time the stabilizer is applied. Such conditioners, in order to be effective, must be applied to the soil when it is in good condition of tilth and such conditioners are helpful in maintaining that condition. On the other hand, the compounds of the present invention are true soil conditioners inasmuch as they can be applied to soil in very poor physical condition and bring about a remarkable change in the physical condition.

Some of the soil conditioners proposed in the past have been applicable only to certain types of soil. However, the soil conditioners of the present invention have been applied to soils of widely varying types with equally advantageous results.

Other soil conditioners which have been proposed are difficult to apply and unless the compounds are applied in accordance with a specificed technique, are ineffective. By contrast, the compounds of the present invention need merely be applied to the soil in any manner to exert their beneficial action. For instance, they can be placed in irrigation water or merely scattered upon the ground in a liquid or solid form.

A completely surprising property of the soil conditioners of the present invention is that they speed up both germination and growth. The mechanism in this action is not at all understood, but as later demonstrated in detail, very pronounced actions upon germination and growth are produced. This is in direct contrast to ordinary contrast to ordinary soil conditioners which either have no effect upon germination or an adverse effect.

In accordance with the present invention the soil conditioner comprises a compound having the formula:

wherein $R_1$, $R_2$ and $R_3$ are the same or dissimilar organic radicals, of which at least two are aromatic radicals, and which may or may not contain other substituents such as chlorine, alkyl radicals, hydroxy radicals, and wherein X is an acid residue, such as a halogen, particularly chlorine, an acetate, a xanthate, or a thiocyanate radical.

The following compounds falling within the above definition have been tested and found to be effective soil conditioning agents. Each compound has had a code number assigned thereto and throughout the balance of the specification, the code numbers will be used:

| Code No. | Description |
|---|---|
| TR-839 | Tri-(p-chlorophenyl) sulfonium chloride. |
| TR-841 | Tri-p-chlorophenyl sulfonium chloride p-chlorothiophenate. |
| TR-846 | Di-p-chlorophenyl pentachloroethyl sulfonium chloride. |
| TR-853 | Di-(p-chlorophenyl) trichloromethyl sulfonium chloride. |
| TR-854 | Di-(p-chlorophenyl) 2-hydroxy-3, 5 dichlorophenyl sulfonium chloride. |
| TR-862 | Di-(p-chlorophenyl) paramethylphenyl sulfonium chloride |
| TR-864 | Phenyl-(p-chlorophenyl) sulfonium chloride. |
| TR-865 | Parahydroxyphenyl di-(p-chlorophenyl) sulfonium chloride. |
| TR-867 | Triphenyl sulfonium chloride. |
| TR-868 | Triphenyl sulfonium 2,4 dichlorophenoxy acetate. |
| TR-869 | Methyl triphenyl sulfonium xanthate. |
| TR-870 | Triphenyl sulfonium thiocyanate. |

In order to demonstrate the effectiveness of these compounds as soil conditioning agents, two types of soil were tested, namely Hugo clay loam having a pH of 5.5, and Alviso clay having a pH of 8.1. In accordance with this test, about three tablespoons of finely ground soil are placed in a paper mold having a 2" diameter and ½" depth. The soil is leveled at the surface and is settled in the molds by tamping the mold. A line is then drawn across the soil surface, dividing it into two parts and two ml. of a 10% solution of the compound in either methanol or acetone is added drop-wise from a pipette so that one-half of the surface is treated. 10 ml. of distilled water is then added from a pipette so that the entire soil surface is thoroughly saturated. The patty is placed in an oven at 110° C. for one hour. At the end of that time, it is taken from the oven, the paper mold removed and the soil patty placed on a watch glass and returned to the oven. The patty is allowed to remain in the oven for one or two additional hours, depending upon the soil. When the soil is thoroughly dry, it is removed from the oven and examined. The examination consists of observation of the granulation, softness and cracking of the soil. TR compounds 839(M), 841(A), 846(A), 853(A), 854(A), 862(M), 864(M), 865(A), 867(M), 868(A), 869(A) and 870(M) were tested in both acid and basic soils, in this manner. The letters (A) or (M) show that the solvent was acetone or methanol, respectively. It was found in each instance that the soil was satisfactory from the standpoint of granulation, softness and cracking with the exception of compounds TR-846 and TR-853, which showed only slight granulation when used in basic soil.

Because it is the least expensive of the compounds listed, TR-867 has been subjected to more extensive tests than the other compounds. This compound was tested as an anti-crusting and anti-cracking agent for soils of various pH. In addition to Hugo clay loam and Alviso clay, described above, Sorrento loam having a pH of 7.1 was used. In each instance, ceramic pots were filled with 1½ pounds of soil, the compound was mixed in irrigation water which was flooded over the entire soil surface. The pots were then allowed to dry and then the measurements made. The rate of application was ten pounds per 100 square feet. The evaluation consisted of observing the soil for cracking including the number, width and distribution of cracks in the soil surface. To determine the crusting, a ⅛" steel rod sharpened to a point was pressed into the soil surface to a depth of ½". The force required to penetrate this depth was used as a measure of crusting. To determine the penetration, the steel rod used above was placed in a spring scale and forced into the soil to a depth of 6". The pounds of pressure required to penetrate six inches of soil is the measure of penetration. The penetration was recorded in pounds of pressure and the crusting and cracking were recorded on a scale wherein 1 represents no crusting or cracking, 2 represents slight crusting or cracking, 3 represents moderate crusting or cracking, 4 severe crusting or cracking, and 5 very severe crusting or cracking. The following results were obtained:

| Treatment | Cracking | | | Hardness | | | Penetration | | | pH | | |
|---|---|---|---|---|---|---|---|---|---|---|---|---|
| | A | B | N | A | B | N | A | B | N | A | B | N |
| Untreated | 5 | 5 | 5 | 5 | 5 | 5 | 3.5 | 10+ | 2.7 | 5.6 | 8.1 | 7.1 |
| TR-867 | 1 | 1 | 1 | 1 | 1 | 1 | 0.7 | 1.7 | 0.4 | 4.2 | 8.0 | 6.5 |

A=Hugo clay loam.
B=Alviso clay.
N=Sorrento loam.

Tests were made to determine the effect of TR-867 upon germinating seeds. The soil was Sorrento loam, and the following treatments were used:

6A and 6D _____ 3 pounds per 100 sq. ft.
8A and 8D _____ 4 pounds per 100 sq. ft.
9A _____ 0.95 pounds per 100 sq. ft.
10A _____ 1.25 pounds per 100 sq. ft.

(The terms 6A, 6D, 8A, etc., are purely arbitrary code numbers, each being used to designate a certain plot of soil and the test run thereon.)

In treatments 6A and 8A, the required TR-867 was mixed with the irrigation water and flooded over the entire soil surface. In treatments 6D, 8D, 9A and 10A, the TR-867 in water solution was applied as a 1" band over the seed row and the entire soil surface subsequently irrigated by flooding. In all the above listed treatments, the seeds were planted prior to treatment. Treatments 9A and 10A were made five days after treatments 6A, 6D, 8A and 8D. The crops planted consisted of lettuce—45 seeds; radishes—30 seeds; peas—12 seeds; and oats—20 seeds. Germination counts were made fifteen days after planting. In each case, germination counts were made 15 days after planting. The following germination counts were obtained:

| Treatment | Lettuce (45) | Radish (30) | Oats (20) | Peas (12) |
|---|---|---|---|---|
| Control | 0 | 14 | 18 | 8 |
| 6A | 2 | 22 | 20 | 5 |
| 6D | 18 | 30 | 18 | 11 |
| 8A | 1 | 24 | 18 | 8 |
| 8D | 24 | 30 | 18 | 11 |
| 9A | 21 | 29 | 19 | 10 |
| 10A | 22 | 30 | 19 | 12 |

To determine the effect of TR-867 on the rate of germination, TR-867 was applied to Sorrento loam at the rates of 1, 1.5, 2, 2.5 and 3 pounds per 100 square feet, in each case being applied as a 1" band over the seed rows before irrigation. 20 tomato seeds were planted in each row. Germination counts were made 6, 7, and 10 days after planting, with the following results:

| Treatment | 6 days after Plant. | 7 days after Plant. | 10 days after Plant. |
|---|---|---|---|
| Control | 4 | 6 | 13 |
| 1.0 lbs./100 sq. ft | 3 | 10 | 19 |
| 1.5 lbs./100 sq ft | 7 | 13 | 18 |
| 2.0 lbs./100 sq. ft | 4 | 12 | 19 |
| 2.5 lbs./100 sq. ft | 8 | 15 | 17 |
| 3.0 lbs./100 sq. ft | 7 | 15 | 19 |

It is sometimes difficult to evaluate a soil conditioner in terms of absolute units, but the following observations were made by skilled observers on the effect of the soil when applied as a band over plants in seed rows before irrigation. There was an immediate granulation of the soil which could be observed even before all the irrigation water had entered the soil. The irrigation water flowed from the untreated strips to the treated strips due to the greater surface porosity of the treated soil. Large surface cracks appeared in the untreated soil strips, but these cracks did not enter the treated soil areas. The untreated soil areas dried out much faster than the treated soil due to the surface cracks. All plants on treated soil made very rapid growth, as the following table shows. Growths are expressed in inches, and treatments are the same as those referred to above under the germination tests:

| Treatment | Radish | | Peas | | Oats | |
|---|---|---|---|---|---|---|
| | Leaves | Height | Leaves | Height | Leaves | Height |
| Control | 2 | 3 | 1¼ | 2¾ | 8½ | 8 |
| 6A | 5 | 4 | 2 | 3 | 10 | 11 |
| 6D | 5 | 7 | 2½ | 6½ | 9 | 12 |
| 8A | 4 | 5¼ | 2½ | 6 | 9 | 11 |
| 8D | 4 | 5½ | 2¾ | 5 | 10 | 13 |
| 0.95 lbs./100 sq. ft. | 4½ | 5½ | 2¾ | 5 | 9 | 11 |
| 1.25 lbs./100 sq. ft. | | | | | | | a. Treatments 6A, 6D, 8A and 8D—28 days after planting.
b. Treatments 0.95 and 1.25 lbs./100 sq. ft.—23 days after planting.

As has been mentioned before, the compounds of the present invention may be applied in a variety of ways. They may be applied as solids to the surface of the soil, applied as solutions or dispersions, or dissolved in irrigation water. Although it is not necessary for successful results, the compounds may be disced or harrowed into the top few inches of soil. The compounds may be applied at a rate of from 5 pounds per 100 square feet to as little as 0.125 per 100 square feet. Ordinarily, it is preferred to apply from about 1 to about 4 pounds per 100 square feet.

I claim:

1. The process of conditioning soil comprising applying to the soil from about 0.125 pound to 5 pounds per 100 square feet of a compound of the formula

wherein $R_1$ and $R_2$ are aromatic radicals and $R_3$ is an organic radical and wherein X is an acid residue.

2. The process of claim 1 wherein the rate of application is from 1 to 4 pounds per 100 square feet.

3. The process of claim 1 wherein the compound is added to irrigation water for application to the soil.

4. The process of conditioning soil comprising applying to the soil from about 0.125 pound to 5 pounds per 100 square feet of a compound of the formula

wherein each R is an aromatic radical and wherein X is an acid residue.

5. The process of conditioning soil comprising applying to the soil from about 0.125 pound to 5 pounds per 100 square feet of triphenyl sulfonium chloride.

References Cited in the file of this patent

UNITED STATES PATENTS

| 2,178,353 | Werntz | Oct. 31, 1939 |
| 2,185,654 | van Peski | Jan. 2, 1940 |
| 2,193,963 | Harris | Mar. 19, 1940 |
| 2,366,176 | Britton et al. | Jan. 2, 1945 |
| 2,402,016 | Britton et al. | June 11, 1946 |

FOREIGN PATENTS

| 152,172 | Austria | Jan. 10, 1938 |